(12) United States Patent
Xue et al.

(10) Patent No.: US 12,461,755 B2
(45) Date of Patent: Nov. 4, 2025

(54) TECHNIQUES FOR SHUTDOWN ACCELERATION

(71) Applicant: INTERNATIONAL BUSINESS MACHINES CORPORATION, Armonk, NY (US)

(72) Inventors: Xiang Yu Xue, Beijing (CN); Bo Chen Zhu, Xi'an (CN); Hui Wang, Beijing (CN); Mai Zeng, Beijing (CN); Xiao Chen Huang, Beijing (CN); Peng Hui Jiang, Beijing (CN); Wei Li, Beijing (CN); Yu Mei Dai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 18/300,987

(22) Filed: Apr. 14, 2023

(65) Prior Publication Data

US 2024/0345847 A1    Oct. 17, 2024

(51) Int. Cl.
*G06F 9/4401* (2018.01)
*G06F 9/455* (2018.01)

(52) U.S. Cl.
CPC .......... *G06F 9/442* (2013.01); *G06F 9/45558* (2013.01); *G06F 2009/45562* (2013.01); *G06F 2009/4557* (2013.01)

(58) Field of Classification Search
CPC .................. G06F 9/442; G06F 9/45558; G06F 2009/45562; G06F 200/4557
See application file for complete search history.

(56) References Cited

U.S. PATENT DOCUMENTS

| 6,230,181 B1 | 5/2001 | Mitchell |
| 7,181,746 B2 | 2/2007 | Perycz |
| 7,254,733 B2 * | 8/2007 | Nichols ............... G06F 9/45558 709/208 |

(Continued)

FOREIGN PATENT DOCUMENTS

| CN | 101620539 B | 12/2013 |
| CN | 103207799 B | 4/2016 |

(Continued)

OTHER PUBLICATIONS

Topological Sorting—Wikipedia (Year: 2021).*

(Continued)

*Primary Examiner* — Kim Huynh
*Assistant Examiner* — Cole Jiawei Wentzel
(74) *Attorney, Agent, or Firm* — Lily Neff (57) ABSTRACT

A method, computer system, and a computer program product are provided for managing an accelerated shutdown of a networked system having a having a plurality of nodes. The system to be shutdown is analyzed and a priority order is determined for the nodes. An interval period is also determined between each node according to the priority order. A leaf node set is constructed according to different shutdown types required for each node and a dependency tree is constructed by analyzing the leaf node sets. Each node is then shutdown according to the tree and the interval period determined. The dependency tree and the interval period is iteratively modified during the node shutdown until all nodes and ultimately the system shutdown has been completed.

20 Claims, 8 Drawing Sheets

(56) References Cited

U.S. PATENT DOCUMENTS

| | | |
|---|---|---|
| 7,533,277 B2 | 5/2009 | Bernstein |
| 8,719,820 B2 | 5/2014 | Jones |
| 9,830,181 B2 | 11/2017 | Chu |
| 10,346,305 B2 | 7/2019 | Gschwind |
| 2007/0101167 A1* | 5/2007 | Lindley ................. G06F 1/3209 713/300 |
| 2018/0203718 A1* | 7/2018 | Kia ..................... G06F 9/45558 |
| 2019/0042460 A1 | 2/2019 | Trika |

FOREIGN PATENT DOCUMENTS

| | | |
|---|---|---|
| CN | 103914325 B | 4/2017 |
| WO | 2008004210 A1 | 1/2008 |

OTHER PUBLICATIONS

Parallel Task Scheduling—Wikipedia (Year: 2022).*
Task Scheduling with dependencies and worker allocation—Stack Overflow (Year: 2022).*
Google, "Running Shutdown Scripts", Google.com, [accessed Jan. 13, 2023], 7 pgs., Retrieved from the Internet: <https://cloud.google.com/compute/docs/shutdownscript>.

* cited by examiner

TECHNIQUES FOR SHUTDOWN ACCELERATION

BACKGROUND

The present invention relates generally to the field of computer network management and more particularly to techniques for accelerated system shutdown.

In a networked computer, multiple subsystems and components run on a mainframe. This includes various infrastructures, middleware, applications, and workloads. The latter work together to ensure the success of key business. The subsystems depend on each other and affect each other's success and task completion. Shutting down the entire system or even parts of the system becomes complex due to these interdependencies. Incorrect shutdowns can affect data integrity. Restarting the system can also become complex due to an incorrect shutdown.

Furthermore, due to the complexity and dependency of subsystems on the mainframe, an automation tool may be used to shut down a mainframe image. But a complex mainframe shutdown can take tens of minutes, so if the image shutdown time can be optimized, it will save a lot of time for customers and reduce the impact on key business.

SUMMARY

Embodiments of the present invention disclose a method, computer system, and a computer program product for managing an accelerated shutdown of a networked system having a plurality of nodes. The system to be shutdown is analyzed and a priority order is determined for the nodes to be shutdown accordingly. An interval period is also determined between each node for shutdown according to the priority order. A leaf node set is constructed according to different shutdown types required for each node and a dependency tree is constructed by analyzing the leaf node sets. Each node is then shutdown according to the tree and the interval period determined. The dependency tree and the interval period is iteratively modified during the node shutdown until all nodes and ultimately the system shutdown has been completed.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
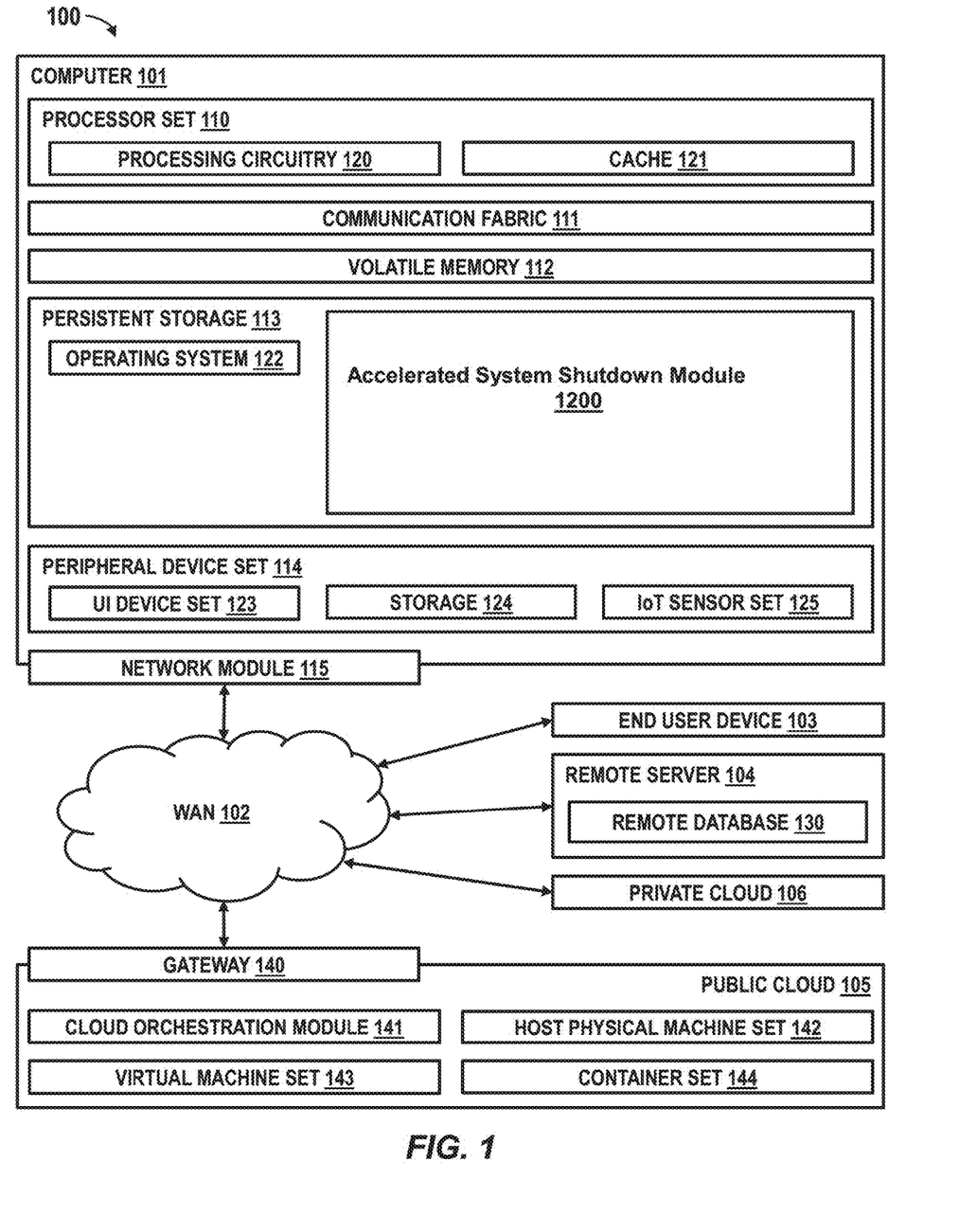
FIG. 1 illustrates a networked computer environment, according to at least one embodiment.

FIG. 1 provides a block diagram of a computing environment 100. The computing environment 100 contains an example of an environment for the execution of at least some of the computer code involved in performing the inventive methods, such as code change differentiator which is capable of providing an Accelerated System Shutdown module (1200). In addition to this block 1200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 1200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 1200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and rewriting of data. Some familiar forms of persistent storage include magnetic disks and solid state storage devices. Operating system 122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As mentioned earlier, during a mainframe shutdown, security and efficiency need to be closely monitored as the shutdown and restarting process may be a complex one and may result in many problems. Consequently, the shutdown process may often be handled manually which can be very time consuming and can lead to other issues. In many cases, a forced shutdown policy may be applied to a mainframe. However, while this policy does not cause much damage, in many instances it needs to be avoided to ensure the shutdown runs safely and smoothly.

Figure 2:
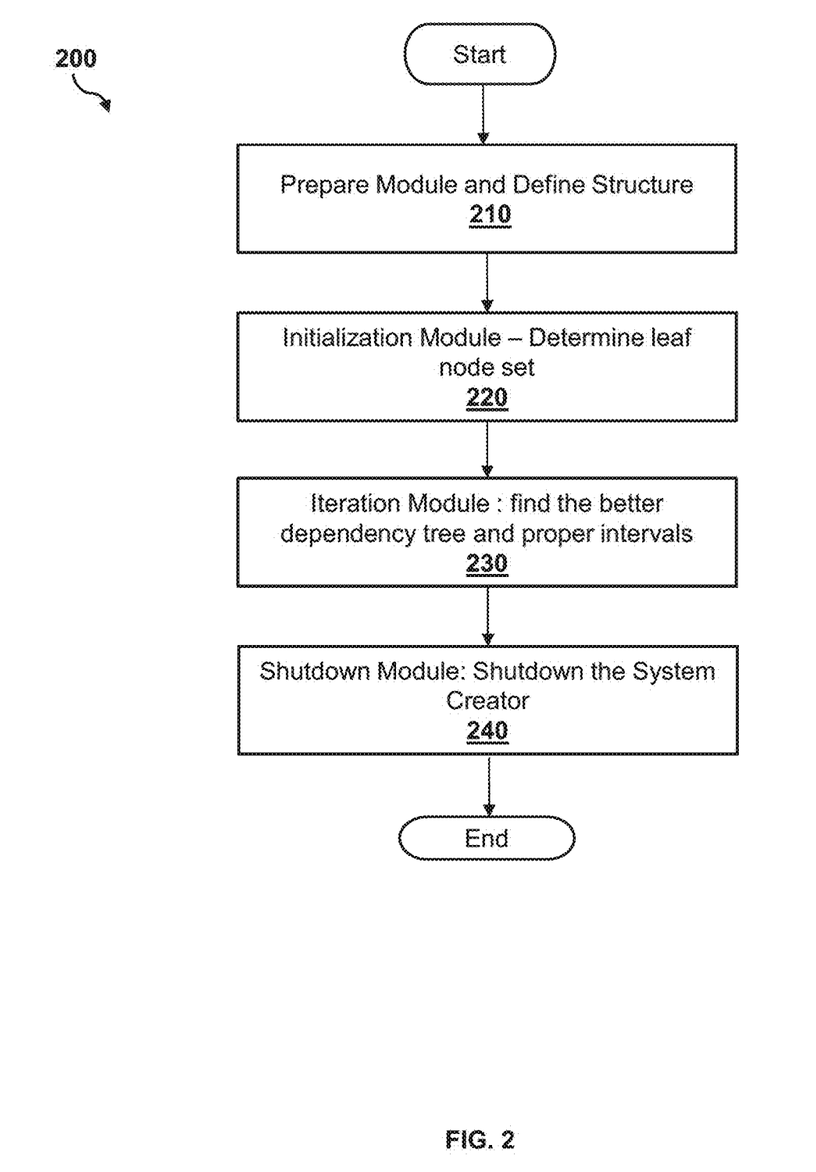
FIG. 2 provides an operational flowchart for an accelerated system shutdown management, according to one embodiment.

Embodiments of the present invention disclose a method, computer system, and a computer program product for an accelerated system shutdown process that avoids the problems discussed above. FIG. 2 provides a flowchart illustration of this according to one embodiment. FIG. 2 at 200, provides for an accelerated system shutdown process. In order to solve the problems of long shutdowns, time-consuming or complex shutdown sequences, excessive reliance on manual experience, and negative effects of forced shutdowns, the process 200 provides for a technique to provide an accelerated shutdown time. This process 200 optimizes and defines the shutdown sequence of each node and ultimately the entire system.

A node can be defined as a connection in any point of the computer network system. A node can be less than a device or a device or even a subsystem. In a scenario where the node may be a subsystem, the process 200 can also find an optimal shutdown time for each subsystem and takes into account the strong/weak dependencies between subsystems and forced shutdown policies. In one embodiment, a policy can be rules provided for a shutdown based on the system and node dependencies. It may include—but is not limited to—rules for a forced shutdown.

Figure 4:
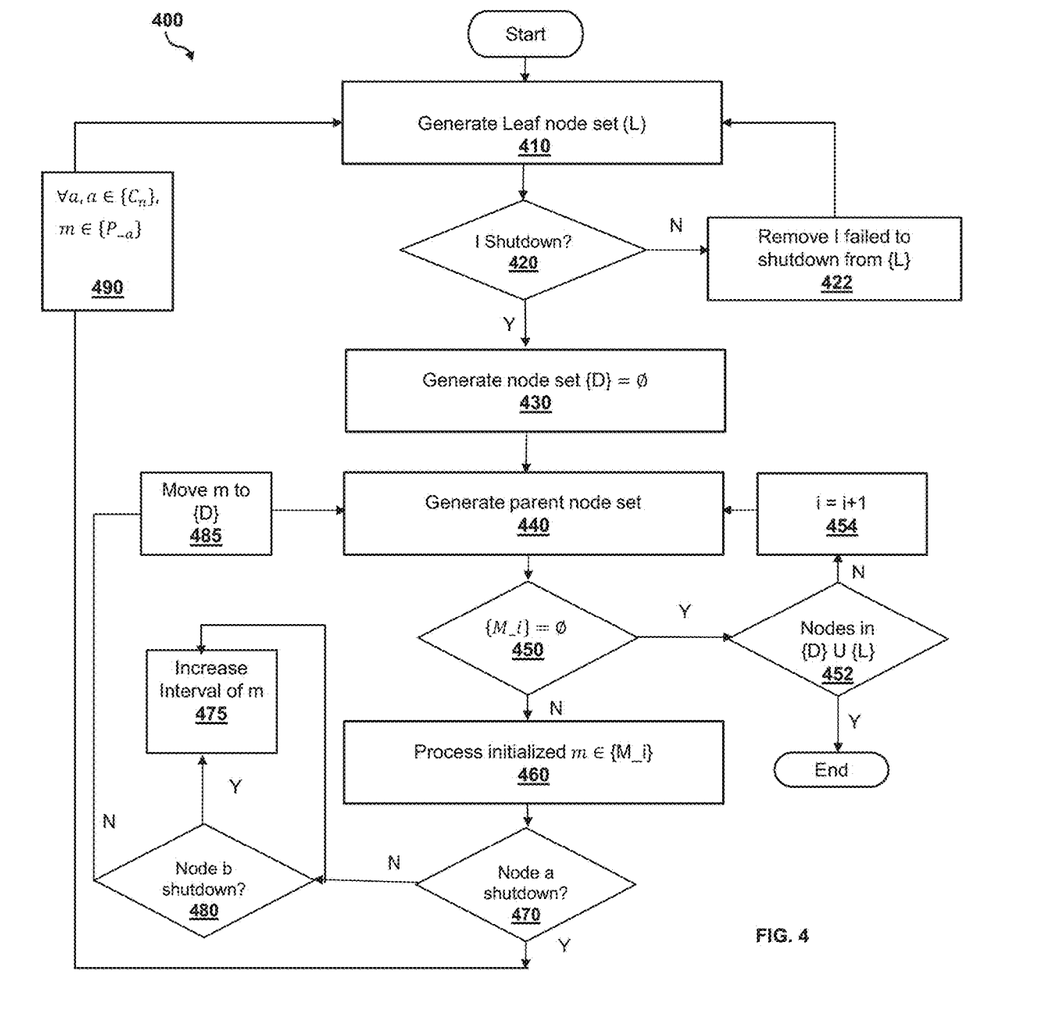
FIG. 4 provides a flow diagram of an iteration module, according to one embodiment.

In Step 210, the module(s) that will be affected by the shutdown will be prepared (See FIG. 4 as well). This may include information about the shutdown start time and any relationships or interdependencies in operation and in a dependency tree.

In Step 220, an initialization process may be performed for initializing the nodes prior to shutdown. This can involve finding leafy nodes in a relational tree (a leafy node is a node in a data structure that has no children.

Step 230 involves an iteration process. This involves iterating from leaf nodes to root node to find a more optimized relationship between nodes and finding a proper interval (so that one node adequately shuts down before another one starts shutting down as to not jeopardize data integrity) of each node according to shutdown effect between nodes.

Finally in Step 240, the shutdown process commences. This step involves shutting down the system according to a shutdown time calculated which will be discussed presently. The strategy should avoid a forced shutdown as much as possible.

To calculate intervals and time for shutdown, the following may be considered.
1. Let $\{D\}$ be the set which has been adjusted.
2. Initialized interval ($I_s$) iteration starts from the leaf node:
For leaf node l,
$I_{ls}=0$
For the common node n,
$I_{ns}=\max I_\alpha$
$\alpha \in \{c_n\}$
It should be noted that:
1) D is a set of all nodes that have been adjusted in the process of calculating the appropriate shutdown sequence. For example, if we first calculate node N, we have found the appropriate shutdown time of N, and before entering the next step, we will put N into the D set to indicate that it has been adjusted. This set is variable. When all nodes are in D, our calculation is complete.
2) I is 'Interval' and S is the shutdown start time. ($I_{ls}=0$ means shutdown start time of leaf node equals 0.
3) 'a' is just a substitute for cn. A can be any other letter-a is the representation. For $\{cn\}$, c signifies children, and n is any node. The above formula indicates that for a node n, its interval should be the maximum interval of all its children nodes.

Figure 3:
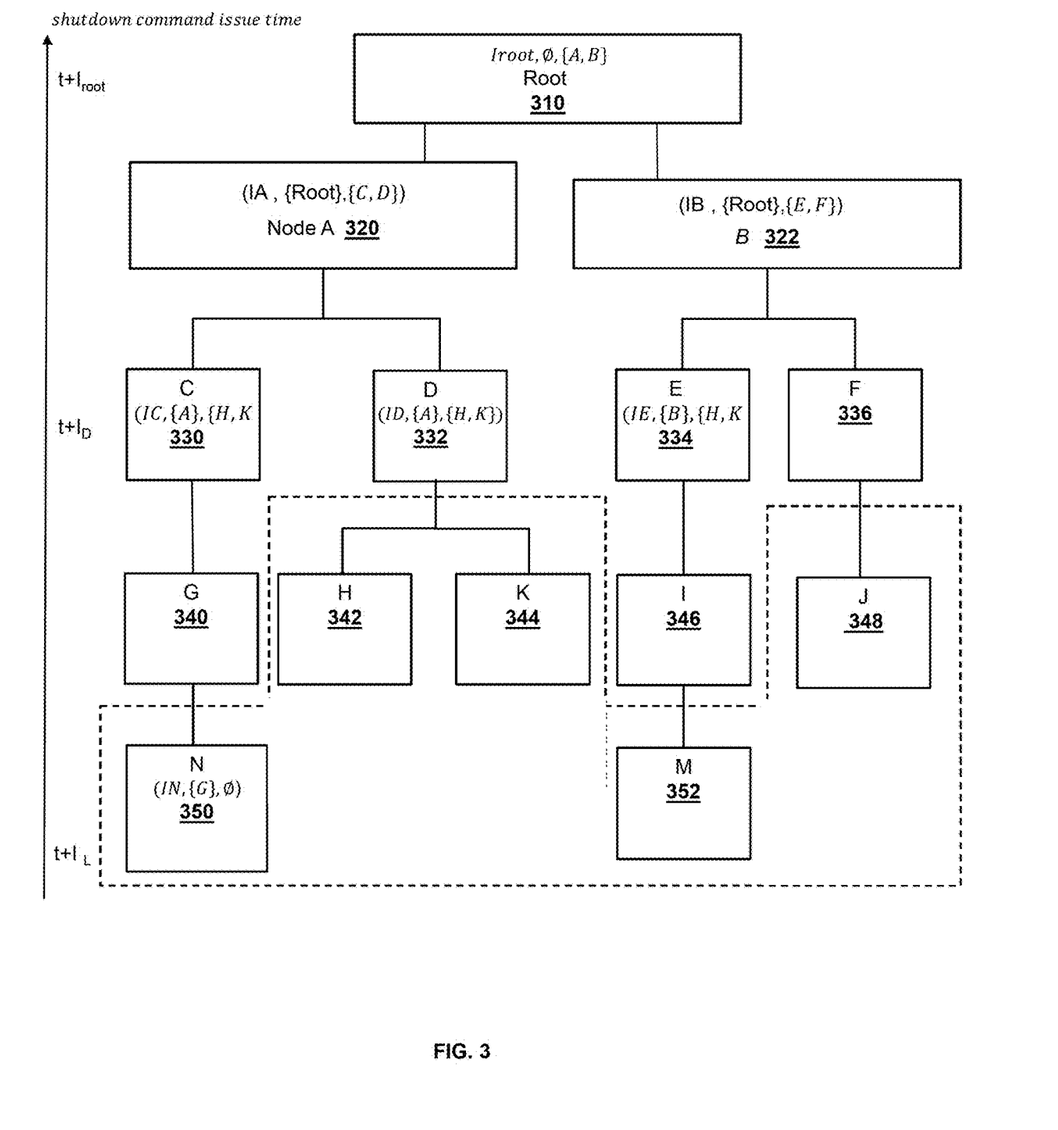
FIG. 3 provides a detailed graphical diagram of a system having nodes A through N, according to one embodiment.

To provide an example, FIG. 3 provides a detailed graphical diagram depiction of a scenario having nodes A through N. This example can be used both in conjunction with FIG. 2 and the flowchart of FIG. 4 to provide additional clarity. Parts of FIG. 3 will also be used to reflect examples provided in the block diagrams of FIGS. 5-7 and the graphical diagram of FIG. 8.

In FIG. 3, nodes 310 to 352 have been provided for convenience in observation. The module may be prepared for shutdown using, in this case, as below:
Each subsystem as a node and define the node meta data as:
(I, $\{P\}$, $\{C\}$)
where:
I—The interval time between the shutdown started and the shutdown command issue for this node;
$\{P\}$—The parents node set. For the root node, $\{P\} \in \emptyset$; and
$\{C\}$—The children nodes set. For the leaf node, $\{C\} \in \emptyset$ In FIG. 3, the progression line defines the shutdown start time and the line on the progression time (on the left). This provides the shutdown command issue time for different nodes A through N 320 to 352. The Root has been shown at 310 and may be defined as (Iroot, $\emptyset$, $\{A, B\}$). In addition different points in the diagram can also be defined. For example, the function at the bottom of the dotted area where node N 350 lies can be defined as (IN, $\{G\}$, $\emptyset$) and at the top of the dotted line where node D lies at 332 can be defined as (ID, $\{A\}$, $\{H, K\}$).

In Step 220 of FIG. 2 during the Initialization process, as was discussed, there may need to be policies that need to adhere to or need to be adjusted prior to the shutdown process can commence. This and other specifics of the Initialization process are shown in FIG. 4.

In one embodiment, as shown in FIG. 4, the policy adjustment iteration may be provided in the following manner:
1. Generate a policy only contains leaf node set $\{L\}$—as shown at 410.
2. If leaf I can be shutdown successfully (1∈$\{L\}$ at 420, then the process can move to Step 430, otherwise:
3. If it is not for leaf node l, remove l from $\{L\}$—as shown at 422.

An example can be helpful. Looking back to the example provided in FIG. 3, if a leaf node set is defined as=$\{N, H, K, M, J, B\}$.

In this scenario, the system will try to shutdown=$\{N, H, K, M, J, B\}$, however, in this scenario, B cannot be shut down because E, F haven't been shut down. In this case, B will be removed from leaf node set:
Got $\{L\}=\{N, H, K, M, J\}$
Before:
$\{D\}=\emptyset$
$\{L\}=\{N, H, K, M, J, B\}$
After:
$\{D\}=\emptyset$
$\{L\}=\{N, H, K, M, J\}$ Returning back to FIG. 4, the above after resolution $\{D\}=\emptyset$ is depicted in Step 430 and subsequently a parent node set $\{D\} \cup \{L\}$ is generated in Step 440. In this particular scenario, the policy has to also be adjusted to a node set $\{M\}$, (m∈$\{M\}$, m∈$\{P_l\}$, I∈$\{L\}$). This is shown at Step 450 where the process Initialized interval iteration may be checked and when it does not exist (start from the existed policy), for node m∈$\{M\}$, the process may be initialized for interval iteration. This then leads to Step 450 where the run may be checked for the shutdown type of all nodes.

In Step 470, a check may be made for run and shut down of off nodes. In other words, in Step 470, if $\exists a \notin \{D\} \cup \{L\}$, node a is force shutdown. Then $\forall a$, $a \in \{C_n\}$, $n \in \{P_a\}$ as reflected in Step 490. The same may be provided in Step 480, where any node b is checked for run and force shutdown b$\in \{D\} \cup \{L\}$. Else, in both cases (470 and 480), the system increases $I_m$ in Step 475 and redo the loop until there may be no force shutdowns. Then in the next step the system stores $I_m$ and m to $\{D\}$ as shown at Step 485.

Figure 5:
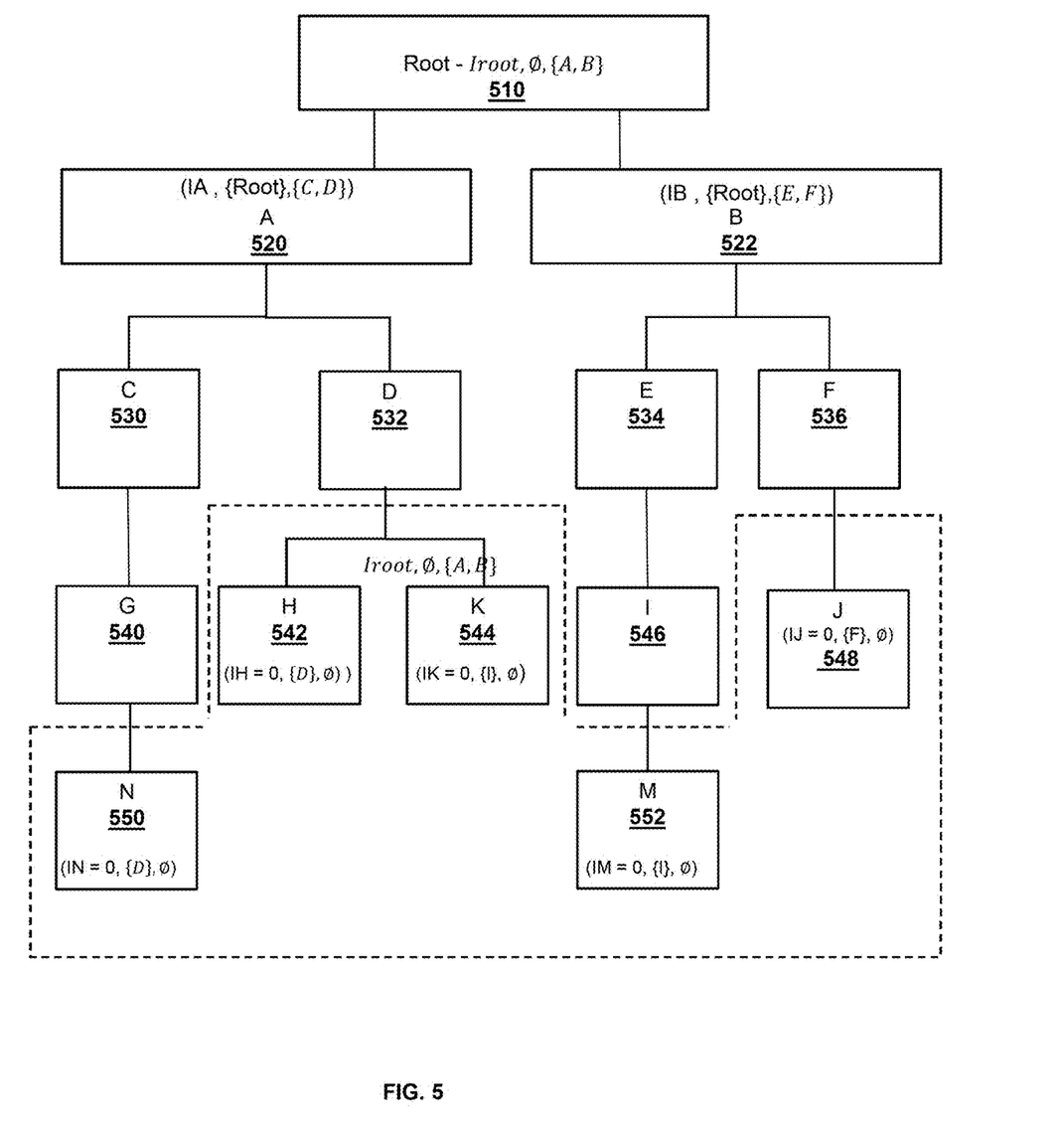
FIG. 5 provides a block diagram for an example according to embodiment of FIG. 4.

An example can be provided with regard to FIGS. 3 and 4, as provided in FIG. 5 for more clarity. In this scenario, the set $\{M\}=\{G, D, I, F\}$ is used to process an initialized interval.

For node D, $$ID = \max_{a \in \{H, K\}} I_a = 0$$

Figure 6:
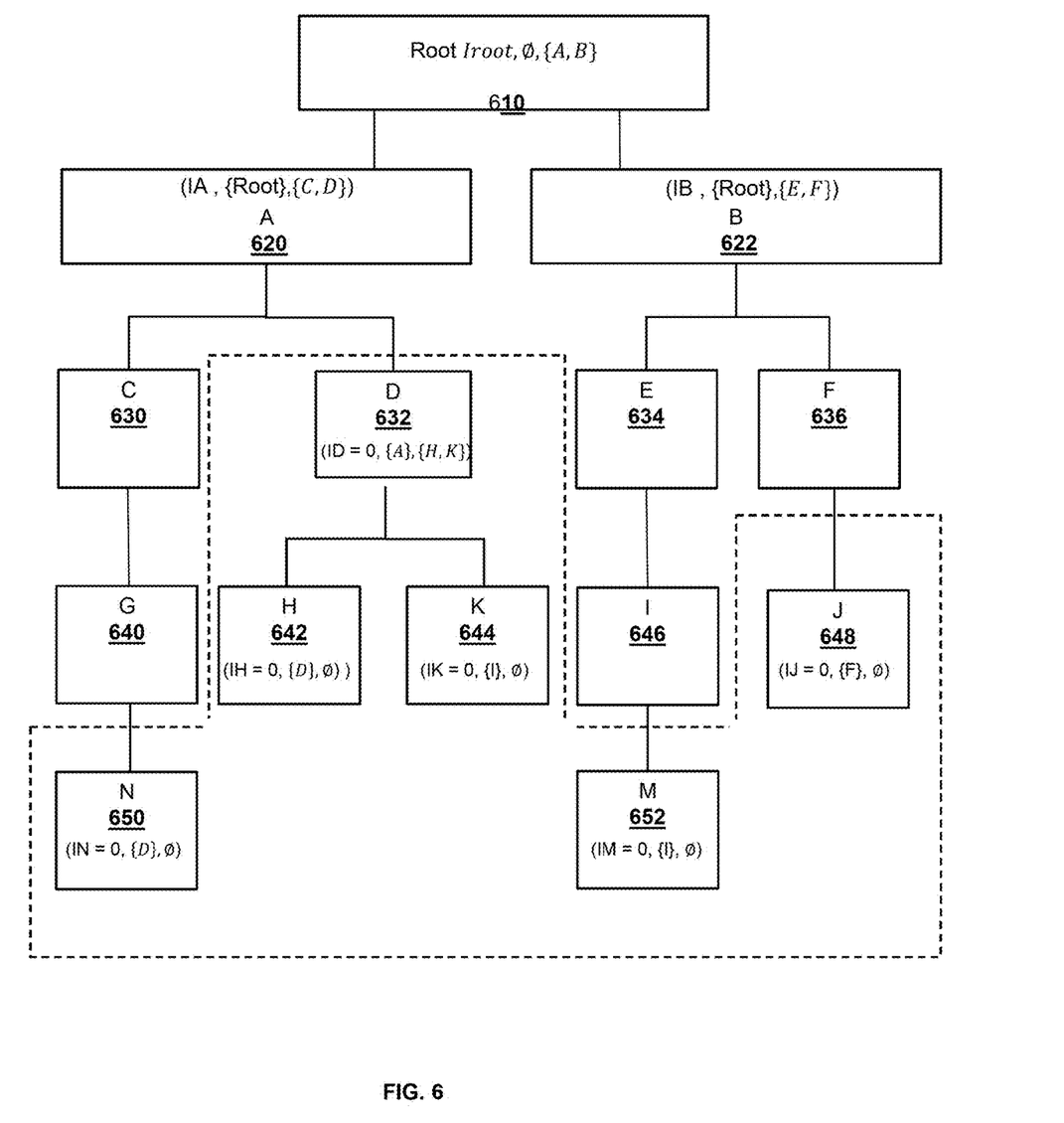
FIG. 6 provides a block diagram for an alternate scenario according to embodiment of FIG. 4.
Figure 7:
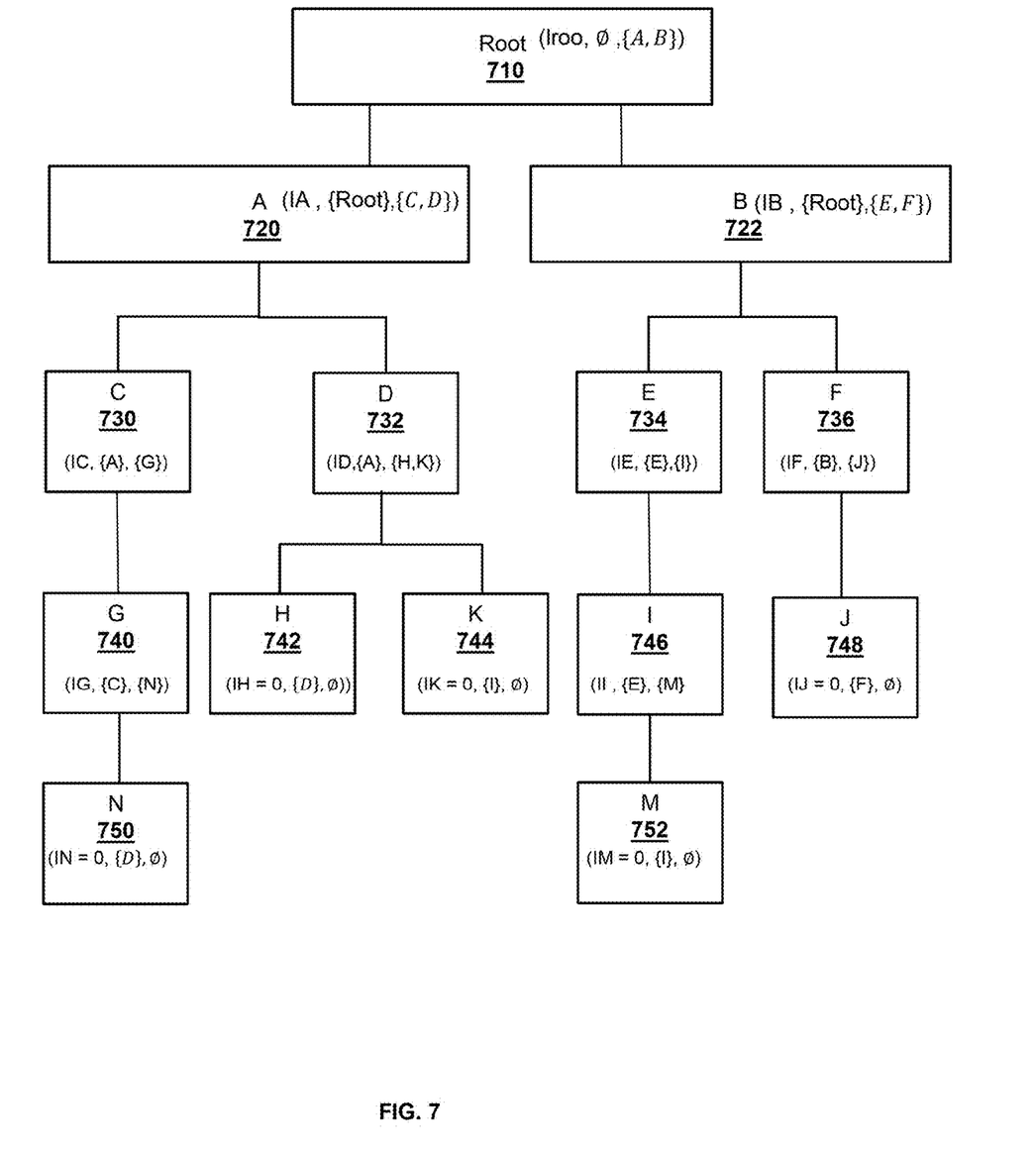
FIG. 7 provides a block diagram for a summary outcome, according to one embodiment.

In order to shut down the system according to the current policy, it may be required to increase ID till there will be no forced shutdown. In this case, the process flow may be:
Move D to $\{D\}$
Process $\{G, I, F\}$ in a similar way
Before:
  $\{D\}=\emptyset$
  $\{L\}=\{N, H, K, M, J\}$
After:
  $\{D\}=\{G, D, I, F\}$
  $\{L\}=\{N, H, K, M, J\}$ Another example can be provided for node set $\{N\}$. This is shown in FIG. 6.

In a first case scenario, the policy may be adjusted for a next node next level node set:
$\{N\}$, ($n \in \{N\}$, $n \in \{P_m\}$, $m \in \{D\} \cup \{L\}$).
a. Start from existing policy.
b. For node $n \in \{N\}$, process Initialized interval iteration.
c. "Run and check" step prior to the shutdown type of all nodes.
  i. If $\exists a \notin \{D\} \cup \{L\}$, node a is force shutdown, then $\forall a$, $a \in \{C_n\}$, $n \in \{P_a\}$.
  ii. Else, the system will increase $I_m$ and redo until there are no forced shutdown (3$^{rd}$ iteration here). The system will then store $I_n$ and move n and to $\{D\}$
d. Redo 3(b) and 3(c) until $\{N\}=\emptyset$.

Figure 8:
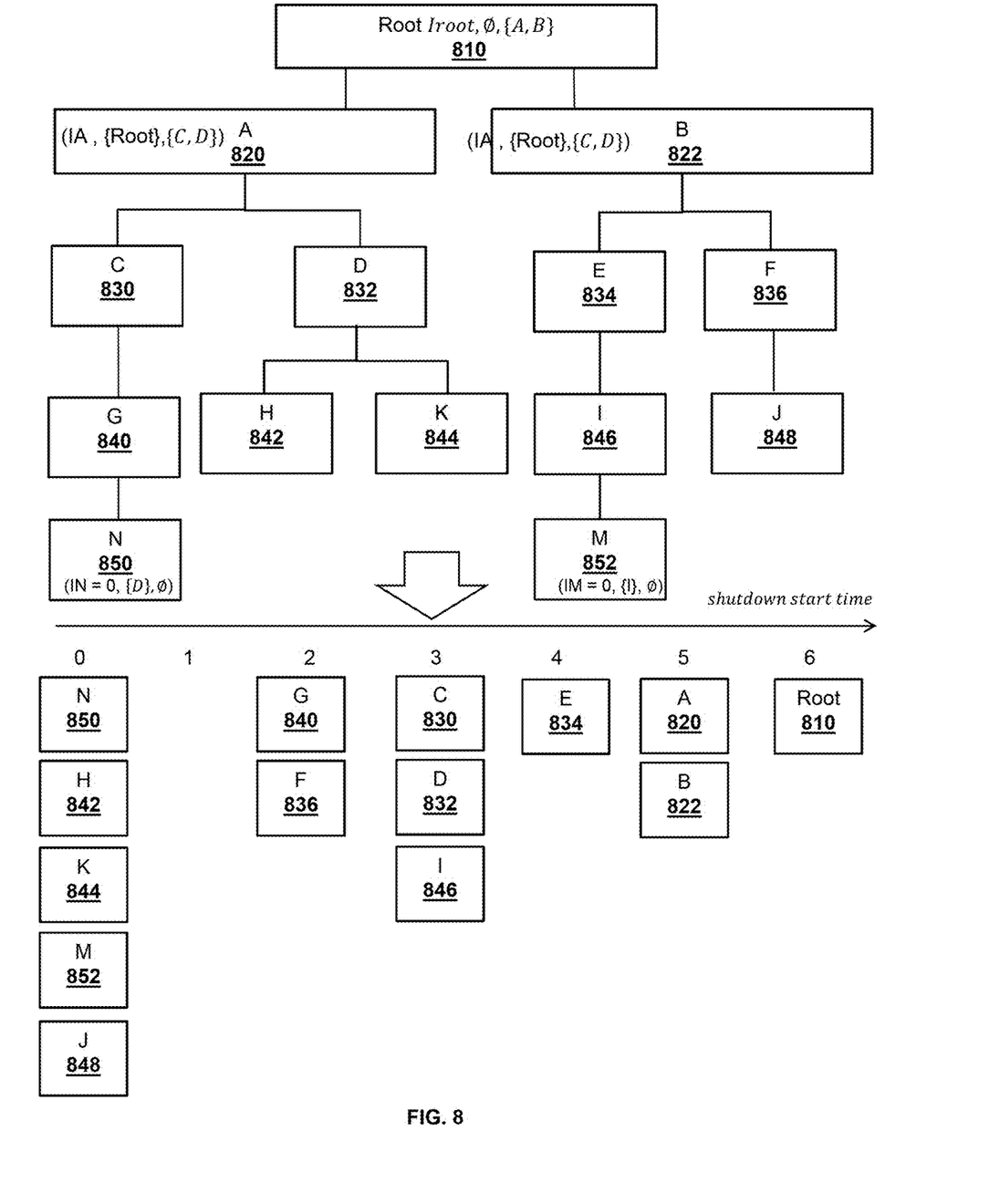
FIG. 8 provides a graphical diagram showing a shutdown order according to embodiment of FIG. 7.

The above may translate into:
1. Define set $\{N\}$, $\{D\} \cup \{L\}=\{N, H, K, M, J, G, D, I, F\}$, so
$\{N\}=\{G, D, I, F, C, A, E, B\}$
2. Process initialized interval.
For node A,
  IA=max $I_a$
  $a \in \{C, D\}$
3. Shut down system according to current policy. $C \notin \{D\} \cup \{L\}$. Node C will be forced shutdown because D has been shut down already. The node meta data of D should be:
(ID, $\{A\}$, $\{H, K, C\}$)
4. Break:
Before:
  $\{D\}=\{G, D, I, F\}$
  $\{L\}=\{N, H, K, M, J\}$
After:
  Break In an alternate embodiment, also shown by FIG. 6, using the same scenario yields:
1. Define set $\{N\}$, $\{D\} \cup \{L\}=\{N, H, K, M, J, G, D, I, F\}$, so
$\{N\}=\{G, D, I, F, C, A, E, B\}$
2. Process initialized interval.
For node A,
  IA=max $I_a$
  $a \in \{C, D\}$
3. Shutdown system according to current policy
4. Increase IA until no forced shutdown.
5. Move A to $\{D\}$
6. Process $\{G, D, I, F, C, E, B\}$ in a similar way
So
  Before:
    $\{D\}=\{G, D, I, F\}$
    $\{L\}=\{N, H, K, M, J)\}$
  After:
    $\{D\}=\{G, D, I, F, C, A, E, B\}$
    $\{L\}=\{N, H, K, M, J\}$
Yet in a different scenario:
1. Define set $\{N\}$, $\{D\} \cup \{L\}=\{N, H, K, M, J, G, D, I, F\}$, so
$\{N\}=\{G, D, I, F, C, A, E, B\}$
2. Process initialized interval.
For node A,
  IA=max $I_a$
  $a \in \{C, D\}$
3. Shut down system according to current policy.
4. Increase IA till no force shutdown.
5. Move A to $\{D\}$.
6. Process $\{G, D, I, F, C, E, B\}$ in a similar way.
So
  Before
    $\{D\}=\{G, D, I, F\}$
    $\{L\}=\{N, H, K, M, J\}$
  After:
    $\{D\}=\{G, D, I, F, C, A, E, B\}$
    $\{L\}=\{N, H, K, M, J$ The different examples above can be combined to provide an overall combination of policy adjustment after reiterations (redoing the steps 3s above). The final outcome of this example is provided in FIG. 7. Underneath each node A to N (720 to 754), there is a formula for the function/outcome. This will provide,
Before:
  $\{D\}=\{G, D, I, F, C, A, E, B\}$
  $\{L\}=\{N, H, K, M, J\}$
After:
  $\{D\}=\{G, D, I, F, C, A, E, B, Root\}$
  $\{L\}=\{N, H, K, M, J\}$ FIG. 7 will ultimately lead to the calculation of shutdown start time as shown in FIG. 8. FIG. 8 shows the same node distribution 810 to 852 as represented in FIGS. 3 and 5-7. However, at the bottom of this figure, a graphical representation provides for a progression of the shutdown as shown by intervals 0 to 6. As provided by these numbers (in interval increments—the numbers can represent seconds or other time increments as calculated per interval, as can be appreciated by those skilled in the art.) In this scenario modules N (850), H (842), K (844), M (852) and J (848) can be placed at 0 for shutdown start time and Root at the last (6) as indicated by the graphical representation below. FIG. 8 provides a representation of the Shutdown module, as per one embodiment.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing a networked computer system, having a plurality of nodes, for a shutdown;
    analyzing said networked system and determining a priority order to shut down said plurality of nodes accordingly;
    determining an interval period between each node shutdown according to said priority order;
    constructing a leaf node set for said system according to different shutdown types required for each node;
    constructing a dependency tree by analyzing said leaf node set, wherein said leaf node set is determined from a relational tree generated based on a plurality of parent and children node dependencies, wherein at least two or more nodes are real and not virtual machines;
    generating an optimized plan for shutdown based on a selection of leaf nodes to root nodes detected in said relational tree, wherein optimization includes at least one of application priority, cost or time constraints,
    said optimized plan taking into account a determined time interval for shut down before another node starts to shut down, wherein said determined interval includes a minimum time for storing data as not jeopardize data integrity;
    shutting down nodes according to said tree and said determined interval period between node shutdown; and
    iteratively modifying said dependency tree and said interval period during said node shutdown until all nodes and ultimately said system shutdown has been completed, wherein said modifying includes checking a policy set for a process for initialization of an interval iteration and only allowing the process to be initialized when a policy does not exist for an interval iteration.

2. The computer-implemented method of claim 1, wherein said priority order is determined by structuring said nodes as parent nodes and child nodes.

3. The computer-implemented method of claim 2, wherein said iteration is made from a plurality of leaf nodes to a root node to optimize said dependency tree.

4. The computer-implemented method of claim 3, wherein node shutdown is modified on a step by step basis and aimed to minimize said interval time between each nodes shutting down to save a shutdown time for the system and to minimize shutdown waiting time between said nodes.

5. The computer-implemented method of claim 1, wherein a plurality of nodes can be shutdown simultaneously based on said dependency tree.

6. The computer-implemented method of claim 1, wherein a node is a subsystem.

7. The computer-implemented method of claim 1, wherein a shutdown command is sent to each node for shutdown.

8. The computer-implemented method of claim 1, wherein a policy is generated and iteratively modified for each node shutdown based on said dependency tree.

9. A networked computer system for managing an accelerated shutdown of a plurality of nodes, comprising:
    one or more processors, one or more computer-readable memories, one or more computer-readable tangible storage medium, and program instructions stored on at least one of the one or more tangible storage medium for execution one or more processors via at least one of the one or more memories, wherein the networked computer system is enabled to perform steps comprising:
    analyzing said networked system and determining a priority order to shut down said plurality of nodes accordingly;
    determining an interval period between each node shutdown according to said priority order;
    constructing a leaf node set for said system according to different shutdown types required for each node;
    constructing a dependency tree by analyzing said leaf node set, wherein said leaf node set is determined from a relational tree generated based on a plurality of parent and children node dependencies, wherein at least two or more nodes are real and not virtual machines;
    generating an optimized plan for shutdown based on a selection of leaf nodes to root nodes detected in said relational tree, wherein optimization includes at least one of application priority, cost or time constraints,
    said optimized plan taking into account a determined time interval for shut down before another node starts to shut down, wherein said determined interval includes a minimum time for storing data as not jeopardize data integrity;
    shutting down nodes according to said tree and said determined interval period between node shutdown; and
    iteratively modifying said dependency tree and said interval period during said node shutdown until all nodes and ultimately said system shutdown has been completed, wherein said modifying includes checking a policy set for a process for initialization of an interval iteration and only allowing the process to be initialized when a policy does not exist for an interval iteration.

10. The computer system of claim 9, wherein said priority order is determined by structuring said nodes as parent nodes and child nodes.

11. The computer system of claim 10, wherein said iteration is made from a plurality of leaf nodes to a root node to optimize said dependency tree.

12. The computer system of claim 11, wherein node shutdown is modified on a step by step basis and aimed to minimize said interval time between each nodes shutting down to save a shutdown time for the system and to minimize shutdown waiting time between said nodes.

13. The computer system of claim 9, wherein a plurality of nodes can be shutdown simultaneously based on said dependency tree.

14. The computer system of claim 9, wherein a shutdown command is sent to each node for shutdown.

15. A computer program product for managing and retrieving data dynamically, comprising:
    one or more computer-readable storage medium and program instructions stored on one or more tangible storage medium, program instructions executable by a processor, program instructions comprising:
    analyzing a networked system and determining a priority order to shut down a plurality of nodes accordingly;
    determining an interval period between each node shutdown according to said priority order;

constructing a leaf node set for said system according to different shutdown types required for each node;

constructing a dependency tree by analyzing said leaf node set, wherein said leaf node set is determined from a relational tree generated based on a plurality of parent and children node dependencies, wherein at least two or more nodes are real and not virtual machines;

generating an optimized plan for shutdown based on a selection of leaf nodes to root nodes detected in said relational tree, wherein optimization includes at least one of application priority, cost or time constraints, said optimized plan taking into account a determined time interval for shut down before another node starts to shut down, wherein said determined interval includes a minimum time for storing data as not jeopardize data integrity;

shutting down nodes according to said tree and said determined interval period between node shutdown; and iteratively modifying said dependency tree and said interval period during said node shutdown until all nodes and ultimately said system shutdown has been completed, wherein said modifying includes checking a policy set for a process for initialization of an interval iteration and only allowing the process to be initialized when a policy does not exist for an interval iteration.

16. The computer program product of claim 15, wherein said priority order is determined by structuring said nodes as parent nodes and child nodes.

17. The computer program product of claim 16, wherein said iteration is made from a plurality of leaf nodes to a root node to optimize said dependency tree.

18. The computer program product of claim 17, wherein node shutdown is modified on a step by step basis and aimed to minimize said interval time between each nodes shutting down to save a shutdown time for the system and to minimize shutdown waiting time between said nodes.

19. The computer program product of claim 15, wherein a plurality of nodes can be shutdown simultaneously based on said dependency tree.

20. The computer program product of claim 15, wherein a shutdown command is sent to each node for shutdown.

* * * * *